United States Patent

[11] 3,537,597

| [72] | Inventor | Charles A. Barns<br>Dallas, Texas |
|---|---|---|
| [21] | Appl. No. | 765,485 |
| [22] | Filed | Oct. 7, 1968 |
| [45] | Patented | Nov. 3, 1970 |
| [73] | Assignee | Barns Lumber and Manufacturing<br>Company<br>Dallas, Texas<br>a corporation of Texas |

[54] CABLE CONVEYOR
10 Claims, 8 Drawing Figs.

[52] U.S. Cl................................................... 212/75,
212/77, 212/89, 212/84, 214/1, 214/7, 104/113,
294/104, 294/110
[51] Int. Cl....................................................... B66c 21/08,
B65g 57/00
[50] Field of Search........................................ 212/76, 77,
80, 87, 89, 94, 96, 97, 19, 73, 75, 84; 214/7, 2.5,
15, 15(WB), 12, 13, 14; 294/83.1, 104, 110;
104/113, 146

[56] References Cited
UNITED STATES PATENTS

| 812,952 | 2/1906 | Sayer............................. | 212/76X |
|---|---|---|---|
| 890,306 | 6/1908 | Schmertz....................... | 212/77X |
| 1,228,344 | 5/1917 | Miller et al. .................. | 212/76 |
| 1,729,964 | 10/1929 | Peugh............................ | 212/19 |
| 2,654,631 | 10/1953 | Renfroe......................... | 294/104 |
| 3,190,685 | 6/1965 | Bopp............................. | 294/104X |

*Primary Examiner*—Gerald M. Forlenza
*Assistant Examiner*—Robert J. Spar
*Attorney*—Howard E. Moore ABSTRACT: A conveyor and clamps wherein the clamps, suspended from traveling blocks in a loop in a flexible line, are connected to an article and the loop is shortened to move the article vertically as the traveling blocks move along the line by force of gravity to convey the article horizontally until the loop is lengthened to lower the article. The clamps automatically release the article to deposit same when the weight of the article is released from the clamp.

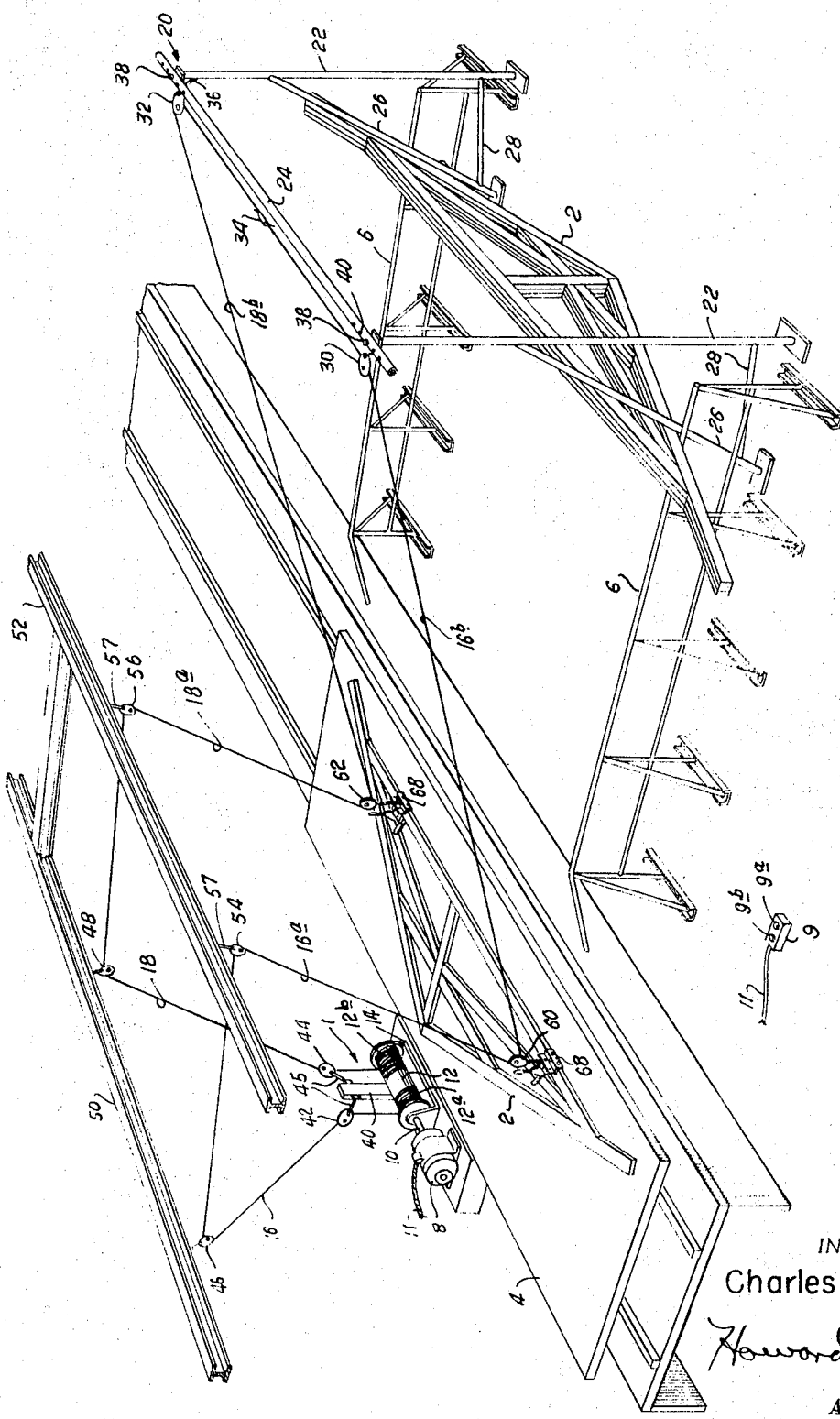

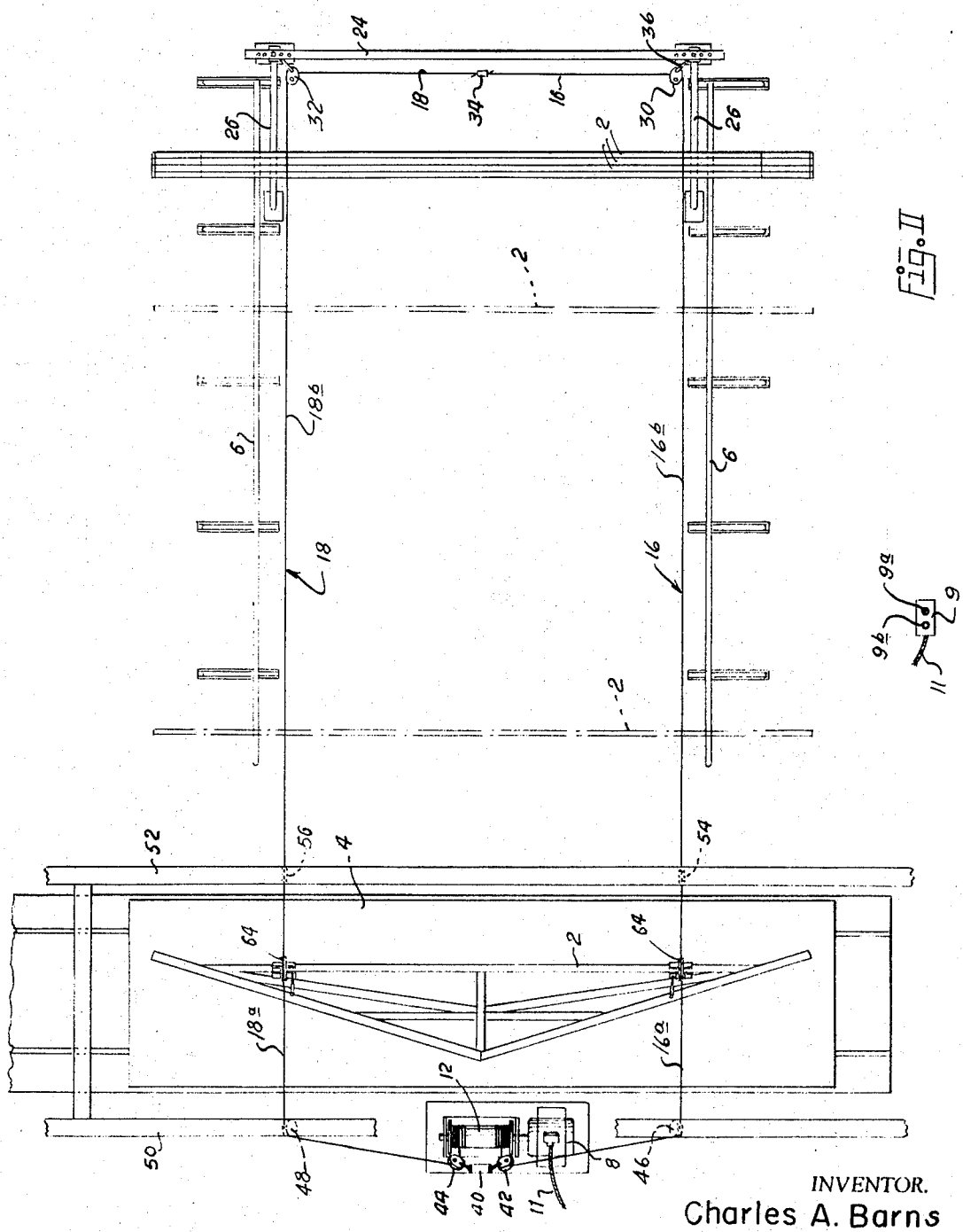

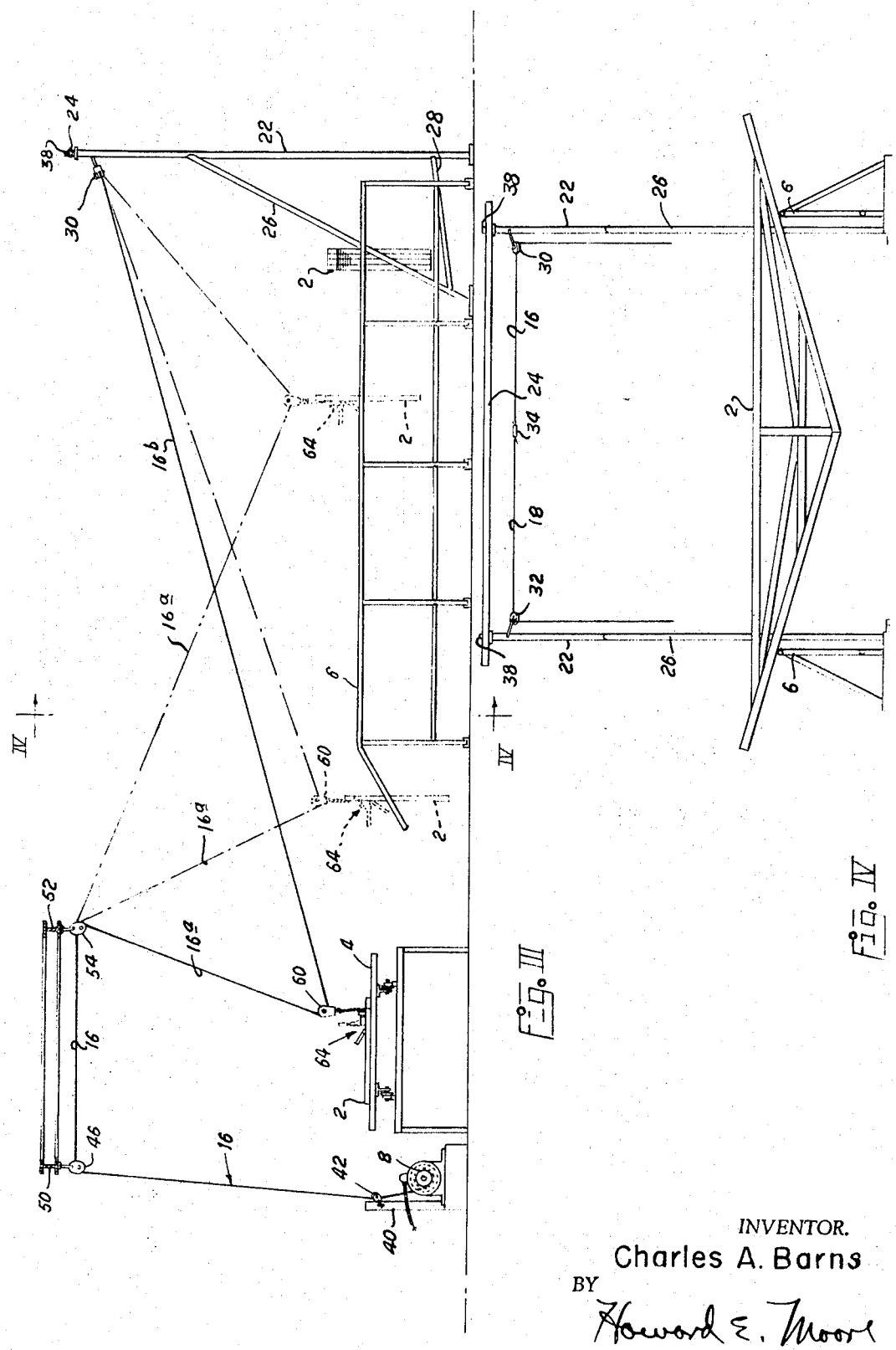

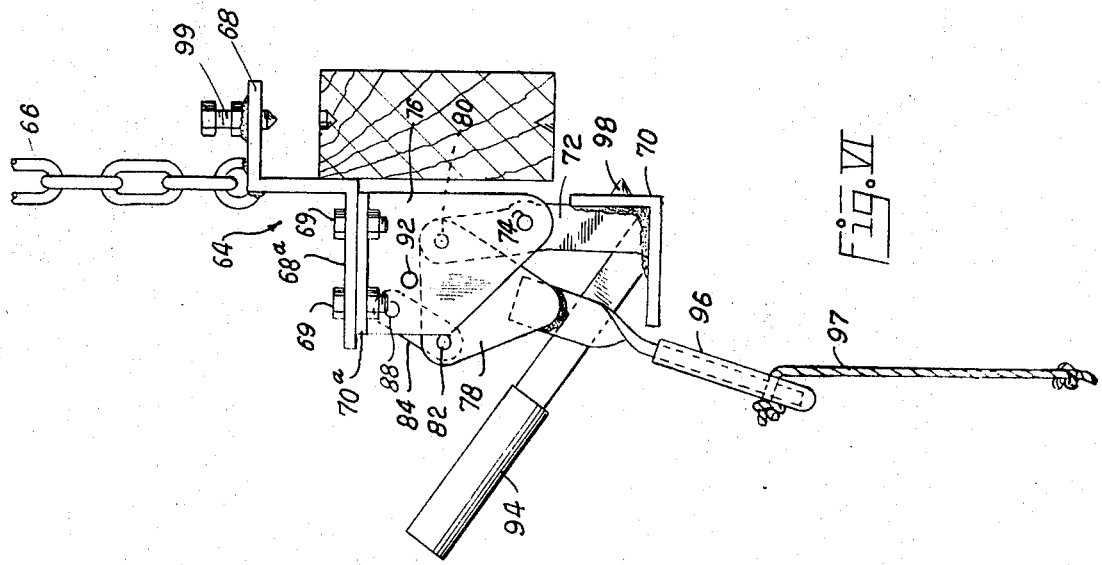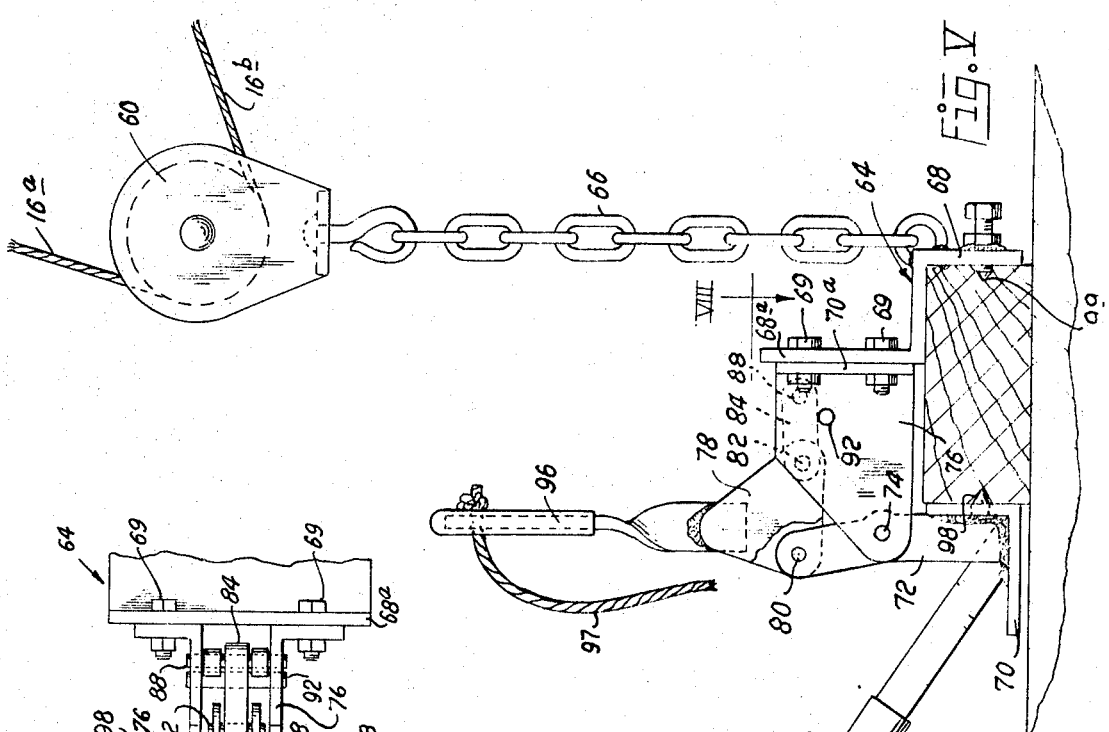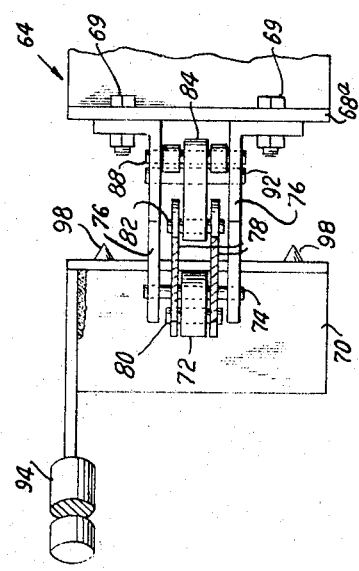

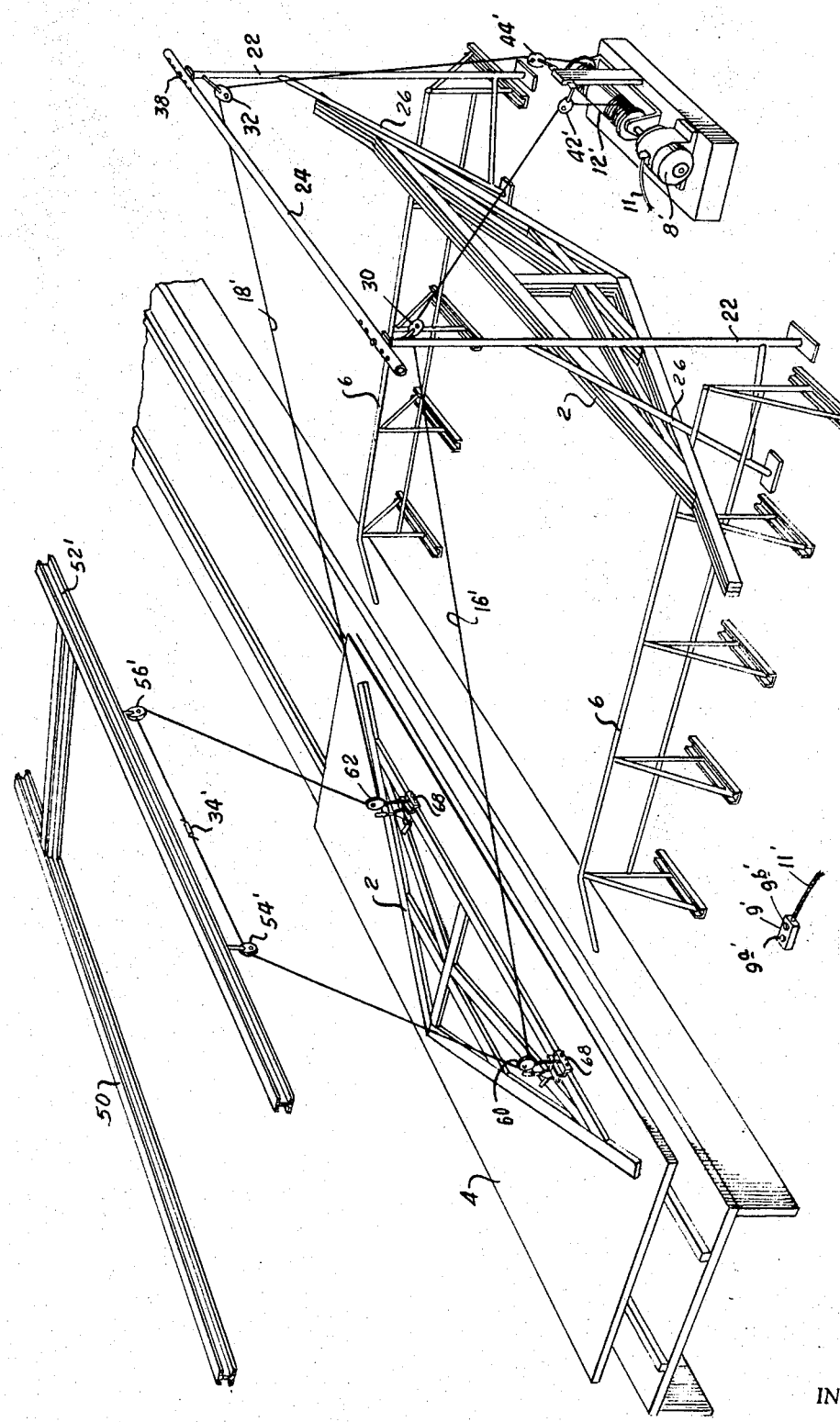
Fig. VII
INVENTOR.
Charles A. Barns
BY Howard E. Moor
ATTORNEY 3,537,597

CABLE CONVEYOR

BACKGROUND OF THE INVENTION

Parts of buildings, such as roof trusses, are often prefabricated at a central plant and then delivered to a construction site where they are assembled. Trusses are usually constructed by positioning boards in a desired configuration upon a conveyor, connecting the individual boards using suitable fasteners, and moving the completed truss to an unloading point where they are removed from the conveyor and deposited at another location where specified numbers of the trusses are usually bound together for handling and hauling. Heretofore no suitable mechanical material handling device has been provided for moving the trusses from the conveyor and depositing them at another location for binding and such was done by hand labor requiring the services of several workmen.

The roof truss for a house is a large bulky triangular structure and it requires about six workmen to manually remove the truss from the conveyor and carry same.

The building trade is a highly competitive business which requires that labor costs be held to a minimum to meet competition.

SUMMARY OF THE INVENTION

I have developed a cable conveyor which may be operated by one man for lifting a roof truss or other structural article from a conveyor after assembly, moving the article to a remote location, and gently depositing same.

The primary object of the invention is to provide a cable conveyor specially suited for lifting and moving large bulky articles such as prefabricated roof trusses.

Another object of the invention is to provide a cable conveyor which may be quickly connected to the article to be conveyed at the pickup point and quickly disconnected from the article at the delivery point.

Another object of the invention is to provide a cable conveyor having no fixed overhead construction or support between the pickup point and the delivery point.

A further object of the invention is to provide a cable conveyor which is portable, allowing the device to be installed quickly and easily.

A further object of the invention is to provide a cable conveyor which is extremely versatile, and is capable of lifting and conveying objects of virtually any size or configuration.

A still further object of the invention is to provide a cable conveyor which is inexpensive to construct and to maintain.

A still further object of the invention is to provide a cable conveyor which requires minimum operator training.

Other and further objects of the invention will become apparent upon reading the detailed specification hereinafter following and by referring to the drawings annexed hereto.

DESCRIPTION OF THE DRAWING

The accompanying drawings of two embodiments of the invention are provided so that the invention may be better and more fully understood, in which:

FIG. I is a perspective view of the cable conveyor constructed in association with a carriage for roof trusses;

FIG. II is a top plan view thereof;

FIG. III is a side elevational view thereof;

FIG. IV is a transverse cross-sectional view taken along lines IV-IV of FIG. III;

FIG. V is an enlarged side elevational view of a clamp utilized for connecting the article to be conveyed to the cable conveyor, said clamp being in the closed position engaging one side of a roof truss;

FIG. VI is a side elevational view of the clamp illustrated in FIG. V, said clamp being in the open position;

FIG. VII is a perspective view of a modified form of the invention; and

FIG. VIII is a cross-sectional view taken along lines VIII-VIII of FIG. V.

Numeral references are employed to indicate the various parts shown in the drawings and like numerals indicate like parts throughout the various FIGS. of the drawings.

DESCRIPTION OF A PREFERRED EMBODIMENT

Referring to the first embodiment of the invention, illustrated in FIGS. I through VI, the numeral 1 generally designates a cable conveyor adapted to lift prefabricated roof trusses 2 from any suitable supporting surface, such as carriage 4, and deposit the truss on suitable racks 6 in a remote position from the carriage.

A suitable source of power, such as electric motor 8, having a drive shaft 10, is operable connected to suitable drawworks, such as windlass or drum 12, rotatably mounted in a suitable bracket member 14. A control box 9 having push button switches 9a and 9b is connected through flexible conduit 11 to the wiring of the motor 8. Control box 9 may be held in one hand at a remote position. Pressing button 9a causes drum 12 to rotate in one direction and pressing button 9b causes it to rotate in the opposite direction.

The running ends of lines 16 and 18 are wound on opposite ends of drum 12. Lines 16 and 18 may be constructed of any suitable material to form a rope or cable having sufficient tensile strength to support truss 2.

The dead ends of cords 16 and 18 are connected to a suitable anchorage member 20 consisting of spaced upright stanchion members 22 having the upper ends thereof adjustably secured to a beam 24. Braces 26 are welded or otherwise rigidly connected to stanchions 22 intermediate the opposite ends thereof and extend outwardly and downwardly therefrom.

Tie bars 28 are rigidly connected between the lower ends of brace 26 and stanchion 22, forming a strong rigid A-frame.

In the particular embodiment illustrated in the drawing, pulleys 30 and 32 are pivotally connected adjacent the upper ends of stanchions 22. Lines 16 and 18 extend through pulleys 30 and 32, respectively, and the ends thereof are joined by a connector 34 to equalize forces in the respective cords. This construction is particularly significant when an article having a centroidal axis offset from the geometric center thereof is being conveyed. It should be noted that clamps 64 need not be positioned equal distances from the center of truss 2 to equalize the tension in cords 16 and 18. The use of two cords and two points of attachment to the article being moved stabilizes the article and minimizes lateral motion.

Pulleys 30 and 32 are connected to stanchions 22 by flexible members 36 allowing the pulleys to pivot freely relative to the stanchions.

Suitable adjusting means such as bolts 38 are utilized for securing beam 24 to the upper ends of stanchions 22. Spaced holes 40 extend through beam 24 allowing stanchions 22 to be adjusted laterally to accommodate trusses of varying size.

In the particular embodiment illustrated in FIG. I of the drawing, drum 12 of the drawworks is positioned at a location below the elevation of truss 2. Therefore, suitable guide means, such as pulleys are required to change the direction of pull on cords 16 and 18 to lift the truss as will be hereinafter explained.

An upright post 40, rigidly connected to bracket 14, has guide pulleys 42 and 44 connected to the upper end thereof by flexible members 45. Sheaves 46 and 48 are mounted in spaced apart relation above pulleys 42 and 44 on overhead support member 50.

A second overhead support member 52, positioned in parallel relation between overhead support 50 and beam 24, has sheaves 54 and 56 connected thereto by flexible members 57.

Line 16, having the dead end thereof connected to line 18 by connector 34, is threaded through pulley 30 on anchorage 20, through sheave 54 on overhead support 52, through sheave 46 on overhead support 50, through pulley 42 on post 40 and the running end thereof is wound around the end 12a of pulley 12. Line 18, extends through pulley 32, sheave 56, sheave 48, pulley 44 and has the running end thereof wound around the end 12b of drum 12.

The bight of each line 16 and 18 has a loop formed therein consisting of legs 16a and 16b and 18a and 18b respectively.

Travelling blocks 60 and 62 are carried by lines 16 and 18 respectively, each of said travelling blocks rotatably receiving the respective loops in the lines.

A clamp 64 is suspended from each travelling block 60 and 62 by a flexible member, such as chain 66, best illustrated in FIGS. V and VI.

Each clamp 64 has a fixed jaw 68 and a moveable jaw 70 arranged to grasp a side of truss 2 or other structural member. The moveable jaw 70 is rigidly connected to one end of crank 72 which is pivotally mounted intermediate the opposite ends thereof on a pin 74 having the opposite ends thereof journaled in the body of the clamp consisting of spaced side plates 76. A triangular plate 78 is pivotally connected by a pin 80 to the outer end of crank 72. Triangular plate 78 is pivotally connected by a pin 82 to one end of toggle link 84 which has the opposite end thereof pivotally anchored between spaced side plates 76 by a pivot pin 88.

A stop 92 extends between spaced side plates 76 in spaced apart relation from pin 88 for limiting rotation of toggle link 84.

A handle 94 is rigidly connected to moveable jaw 70, said handle to be used for locking the moveable jaw in the closed position. A handle 96 is rigidly connected to triangular plate 78 and has a rope 97 connected thereto.

Referring to FIG. V, it should be noted that when the moveable jaw 70 is in the closed position pin 82 extends inwardly of the centerline between pins 80 and 88. The weight of the truss 2 acts downwardly on moveable jaw 70 which exerts an upward force through crank 72, urging plate 78 and link 84 into engagement with stop 92. This locks moveable jaw 70 in the closed position.

When the weight of truss 2 is deposited upon and supported by racks 6, the downward force is removed from the moveable jaw 70 and the weight of triangular plate 78 exerts a moment which causes link 84 to pivot away from stop 92. As pin 82 crosses the centerline between pins 80 and 88 the weight of moveable jaw 70 causes crank 72 to pivot to the position illustrated in FIG. VI, opening moveable jaw 70.

Suitable cleats 98 and 99 extend inwardly from the faces of moveable jaw 70 and fixed jaw 68, respectively, to penetrate and keep truss 2 from slipping relative to the faces of the jaws. Cleat 99 is adjustable by threading same inwardly or outwardly to regulate the pressure exerted on truss 2.

It should be readily appreciated that spacers (not shown) may be inserted between flanges 68a and 70a, which are connected by bolts 69, to adjust the distance between jaw 68 and 70 to adapt the clamp 64 for grasping members of different thickness. For example, if the distance between jaws 68 and 70 is 4 inches and a 6-inch member is to be grasped, a 2-inch spacer is placed between flanges 68a and 70a.

Referring to the second embodiment, illustrated in FIG. VII of the drawing, the drawworks or drum 12' is positioned at the end of the cable conveyor adjacent to anchorage member 22.

Line 16' has the running end thereof wound upon drum 12' and is threaded through pulley 42', pulley 30, travelling block 60, and sheave 54' and the dead end is joined by connector 34' to the dead end of line 18'.

The running end of line 18' is wound upon drum 12' and is threaded through pulley 44', pulley 32, travelling block 62 and sheave 56'.

Sheaves 54' and 56' are freely suspended from member 52' which is the anchor. The operation and function of the devices hereinbefore described are as follows:

Referring to the first embodiment illustrated in FIGS. I—VI, as roof trusses 2 are constructed, carriage 4 is moved laterally to position successive trusses adjacent the cable conveyor 1. A workman standing between carriage 4 and anchorage 20 attaches clamps 64 to a side of truss 2 and moves handle 94 of clamp 64 downwardly to lock the clamp in the closed position about the side as shown in FIG. V.

After clamps 64 are locked in the closed position, the operator presses button 9a on control 9 which energizes motor 8 and causes drum 12 to rotate winding lines 16 and 18 on opposite ends thereof. As lines 16 and 18 are reeled in the loops on which travelling blocks 60 and 62 are mounted are shortened, causing travelling blocks 60 and 62 to be elevated. Each travelling block begins rolling along the respective cords due to the force of gravity attempting to reach the equilibrium position which theoretically exists when legs 16a and 16b and 18a and 18b are of equal length, assuming pulleys 30, 32 and 54, 56 are at equal elevations. However, the truss 2 is carried past the equilibrium position by its own momentum and continues to move toward anchorage 20. It should be noted that as legs 16a and 18a exceed the length of legs 16b and 18b the truss will begin decelerating. The equilibrium point may be shifted by adjusting the elevation of pulleys 30 and 32 relative to that of pulleys 54 and 56.

As truss 2 approaches the position at which it is to be deposited on racks 6 button 9b on control 9 is pressed and motor 8 is reversed, causing drum 12 to rotate in the opposite direction to lengthen lines 16 and 18 thereby causing truss 2 to be gently deposited upon racks 6 allowing slack in lines 16 and 18.

As the weight of truss 2 is thus removed from clamp 64, when the truss is lowered into engagement with racks 6, moveable jaw 70 automatically moves to the open position thereby disengaging the truss to allow it to fall free, as shown in FIG. VI.

If clamp 64 fails to open automatically, the clamp may be opened by pulling on rope 97 which is connected to handle 96 causing triangular plate 78 to rotate to the position illustrated in FIG. VI thereby opening the clamp.

After truss 2 has been removed from clamps 64, travelling blocks 60 and 62 may move back to carriage 4 to be connected to the next truss as it is completed and moved to the pickup point.

The modified form shown in FIG. VII operates in the same manner as described above except that the drum 12' is located at the opposite end of the device.

From the foregoing, it should be readily apparent that I have developed a cable conveyor which can be constructed simply and economically. Articles to be conveyed can be quickly attached to the conveyor and are automatically disconnected therefrom at the deposit point.

While the foregoing description has been directed to a system of cables, pulleys and clamps arranged to lift a truss and move it to a desired location, it should be readily apparent that any other object may be moved without departing from the basic concept of the invention.

I claim:

1. In a conveyor for lifting and moving an article from a pickup point to a delivery point, spaced lines; an elevated anchor; spaced pulleys mounted on the anchor, each line passing around at least one of the pulleys; a connector for joining the ends of the lines to equalize forces in the lines; extending and retracting means connected to the other ends of the lines adapted to extend and retract the lines; elevated guide means positioned between the extending and retracting means and the anchor through which the lines moveably extend; a travelling block mounted in rolling engagement with each line between the anchor and the guide means; suspension means extending below each travelling block adapted to be connected to the article at the pickup point and disconnected from the article at the delivery point whereby retracting the lines causes the travelling blocks to move by force of gravity along the lines from the pickup point to the delivery point.

2. The combination called for in claim 1 wherein the suspension means includes a clamp, and with the addition of the flexible member between the clamp and the travelling block.

3. The combination called for in claim 2 wherein the clamp comprises, a body; a fixed jaw on an upper portion of the body; a moveable jaw pivotally connected to the body below the fixed jaw; and a toggle linkage between the moveable jaw and the body whereby the weight of the article is exerted on the moveable jaw to lock the clamp in the closed position and removing the weight of the article causes the moveable jaw to pivot outwardly to open the clamp and release the article.

4. The combination called for in claim 1 with the addition of spaced racks between the guide means and the anchor for receiving the article as it is moved to the delivery point and deposited thereon.

5. The combination called for in claim 1 wherein the anchor consists of spaced substantially vertical stanchions; a cross member extending between the stanchions; adjustment means for connecting the crossmember to the stanchions; and the lines are connected to the stanchions.

6. The combination called for in claim 5 with the addition of a support mounted in an elevated position above the pickup point; and the guide means includes spaced sheaves mounted on the support through which the lines extend.

7. In a conveyor for lifting and moving an article from a pickup point to a delivery point, spaced lines; an elevated anchor connected to each of said lines adjacent one end thereof; extending and retracting means connected to the other end of each of the lines adapted to extend and retract each of the lines; elevated guide means positioned between the extending and retracting means and the anchor through which the lines moveably extend; a travelling block mounted in rolling engagement with each of the lines between the anchor and the guide means; a plurality of clamps; means to secure a clamp to each travelling block; said clamps being adapted to be connected to the article at the pickup point and disconnected from the article at the delivery point whereby retracting the lines cause the travelling blocks to move by force of gravity along the lines from the pickup point to the delivery point wherein the clamp comprises, a clamp body; a fixed jaw extending outwardly from an upper portion of the clamp body; a moveable jaw pivotally connected to the clamp body and extending outwardly therefrom in spaced relation from the fixed jaw, said moveable jaw being adapted to pivot through an angle of at least 90°; and a toggle linkage between the moveable jaw and the clamp body positioned such that the weight of the article is exerted on the moveable jaw to lock the clamp in a closed position maintaining the moveable jaw substantially parallel to the fixed jaw, and removing the weight of the article from the moveable jaw causes the moveable jaw to pivot to a position wherein the moveable jaw is disposed substantially perpendicular to the fixed jaw to open the clamp and release the article.

8. In a conveyor for lifting and moving an article from a pickup point to a delivery point, support means at the pickup point for supporting the articles to be transferred; elevated anchor means spaced from said support means; elevated guide means horizontally positioned between the support means and the anchor means; extending and retracting means; spaced lines having ends secured to the extending and retracting means, said lines extending through the guide means; means to secure each of the lines to the anchor means; a travelling block mounted in rolling engagement with a segment of each of the lines extending between the guide means and the anchor means; and means to detachably secure an article at horizontally spaced positions to each of the travelling blocks whereby retracting the lines causes the travelling blocks to lift an article from the support means so that the force of gravity will cause the article and the travelling blocks to start to swing about the vertical guide means with the momentum obtained thereby moving the travelling blocks horizontally along the lines to the delivery point.

9. The combination called for in claim 8 wherein the means to detachably secure an article to the travelling blocks comprises clamps, each of said clamps comprising a body; a fixed jaw extending outwardly from said body; a moveable jaw pivotally secured to said body; and means to move the moveable jaw from a closed position through an angle of approximately 90° to an open position.

10. In a conveyor for lifting and moving an article from a pickup point to a delivery point, support means at the pickup point for support the articles to be transferred; elevated guide means spaced from said support means; elevated anchor means positioned between the support means and the guide means; extending and retracting means; spaced lines having ends secured to the extending and retracting means, said lines extending through the guide means; means to secure each of the lines to the anchor means; a travelling block mounted in rolling engagement with a segment of each of the lines extending between the guide means and the anchor means; and means to detachably secure an article at horizontally spaced positions to each of the travelling blocks whereby retracting the lines causes the travelling blocks to lift an article from the support means so that the force of gravity will cause the article and the travelling blocks to start to swing about the anchor means with the momentum obtained thereby moving the travelling blocks horizontally along the lines to the delivery point.